US010633042B2

(12) United States Patent
Trone (10) Patent No.: US 10,633,042 B2
(45) Date of Patent: Apr. 28, 2020

(54) MASTER LINK ASSEMBLY FOR A TRACK CHAIN

(71) Applicant: Caterpillar Inc., Deerfield, IL (US)

(72) Inventor: Matthew Trone, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 69 days.

(21) Appl. No.: 15/983,749

(22) Filed: May 18, 2018

(65) Prior Publication Data

US 2019/0351960 A1 Nov. 21, 2019

(51) Int. Cl.
*B62D 55/21* (2006.01)

(52) U.S. Cl.
CPC ........... *B62D 55/213* (2013.01); *B62D 55/21* (2013.01)

(58) Field of Classification Search
CPC .............................. B62D 55/213; B62D 55/21
USPC ........................................................ 305/186
See application file for complete search history.

(56) References Cited

U.S. PATENT DOCUMENTS

| | | | |
|---|---|---|---|
| 3,717,389 A * | 2/1973 | Boggs | B62D 55/205 152/185.1 |
| 4,457,565 A | 7/1984 | Maurizio | |
| 6,354,679 B1 | 3/2002 | Caterpillar | |
| 6,382,742 B1 | 5/2002 | Caterpillar | |
| 6,783,196 B2 * | 8/2004 | Maguire | B62D 55/0887 305/186 |
| 7,661,774 B2 | 2/2010 | Yamamoto et al. | |
| 7,877,977 B2 | 2/2011 | Caterpillar | |
| 2010/0146925 A1 * | 6/2010 | Johannsen | B62D 55/213 59/85 |
| 2017/0129555 A1 * | 5/2017 | Johannsen | B62D 55/06 |
| 2018/0009491 A1 | 1/2018 | Caterpillar | |

FOREIGN PATENT DOCUMENTS

| | | |
|---|---|---|
| CN | 205769672 U | 12/2016 |
| JP | 2008/018795 A | 1/2008 |
| WO | 20180182879 | 10/2018 |

* cited by examiner

*Primary Examiner* — S. Joseph Morano
*Assistant Examiner* — Jean W Charleston
(74) *Attorney, Agent, or Firm* — Bookoff McAndrews (57) ABSTRACT

A master link for a track chain is disclosed. The master link may include a link body extending from a first end to a second end and a plurality of apertures extending through the link body. The plurality of apertures may include a first aperture positioned proximate the first end, a second aperture unconnected to the first aperture and positioned proximate the second end, and a third aperture arranged between the first and second apertures. A first gap may extend between and connect the third and second apertures. The master link may also include a threaded first fastener that is configured to extend through the link body across the third aperture.

20 Claims, 7 Drawing Sheets

MASTER LINK ASSEMBLY FOR A TRACK CHAIN

TECHNICAL FIELD

The present disclosure relates generally to a master link assembly for a track chain, and more particularly, to an offset clamp master link assembly for a track chain.

BACKGROUND

Track type machines typically utilize tracks or chains on either side of the machine that are connected to surface engaging elements, known as track shoes, to move the machine. A sprocket, driven by an engine of the machine, engages and translates the chain about spaced apart pulley mechanisms. As the chain translates, the connected track shoes engage a ground surface under the machine and propel the machine on the surface. The chains are made of link assemblies coupled together. Track chains can be broadly classified as straight link chains and offset link chains. Straight link chains have alternate inner and outer links that are coupled together while, in an offset link chain, all the links are alike. Both types of chains have advantages and disadvantages. Irrespective of the type of track chain, these chains wear over time and may need to be replaced or serviced. Typically, a master link is provided in the track chain to allow for disassembly of the chain (i.e., separation of two ends of the chain).

An exemplary master link is disclosed in U.S. Pat. No. 6,783,196 ("the '196 patent") issued to Maguire et al. The '196 patent discloses a master link assembly for an straight link chain. In the '196 patent, the master link assembly is split apart to disassemble the track chain. While the master link of the '196 patent may be suitable for some applications, it may not be suitable for other applications. The disclosed master link assembly is directed to overcoming one or more of the shortcomings set forth above and/or other shortcomings in the art. The scope of the current disclosure, however, is defined by the attached claims, and not by the ability to solve any specific problem.

SUMMARY

In one aspect, a master link for a track chain is disclosed. The master link may include a link body extending from a first end to a second end and a plurality of apertures extending through the link body. The plurality of apertures may include a first aperture positioned proximate the first end, a second aperture unconnected to the first aperture and positioned proximate the second end, and a third aperture arranged between the first and second apertures. A first gap may extend between and connect the third and second apertures. The master link may also include a threaded first fastener that is configured to extend through the link body across the third aperture.

In another aspect, a master link assembly for a track chain is disclosed. The master link assembly may include a first link extending from a first end to a second end. The first link may include a first aperture positioned proximate the first end and a second aperture positioned proximate the second end. The first link may also include at least one threaded first fastener coupled to the first link. Changing a relative position of the at least one first fastener with respect to the first link may selectively change a diameter of the second aperture without changing the diameter of the first aperture. The master link assembly may also include a second link extending from a third end to a fourth end. The second link may include a third aperture positioned proximate the third end and a fourth aperture positioned proximate the fourth end. The second link may also include at least one threaded second fastener coupled to the second link. Changing a relative position of the at least one second fastener with respect to the second link may selectively change a diameter of the third aperture without changing the diameter of the fourth aperture. The master link assembly may also include a cartridge assembly configured to be inserted into the second aperture of the first link and the third aperture of the second link.

In yet another aspect, a track chain assembly is disclosed. The track chain assembly may include a plurality of link subassemblies including a first link subassembly and a second link subassembly. The track chain assembly may also include a first master link assembly that includes a pair of first links. Each first link of the pair of first links may include a link body that extends from a first end rotatably coupled to the first link subassembly to a second end and include a first aperture positioned proximate the first end, a second aperture positioned proximate the second end and unconnected to the first aperture, a fifth aperture positioned between the first and second apertures, a first gap extending between and connecting the second and fifth apertures, and a threaded first fastener extending through the link body across the fifth aperture. The track chain assembly may also include a second master link assembly that includes a pair of second links. Each second link may include a link body that extends from a third end rotatably coupled to the first master link assembly to a fourth end rotatably coupled to the second link subassembly and include a third aperture positioned proximate the third end, a fourth aperture positioned proximate the fourth end and unconnected to the third aperture, a sixth aperture positioned between the third and fourth apertures, a second gap extending between and connecting the third and sixth apertures, and a threaded second fastener extending through the link body across the sixth aperture. The track chain assembly may also include a cartridge assembly extending through the second apertures of the pair of first link and the third apertures of the pair of second links.

DETAILED DESCRIPTION

In this disclosure, relative terms, such as, for example, "about" and "approximately" are used to indicate a possible variation of ±10% in a stated numeric value. It should be noted that the description set forth herein is merely illustrative in nature and is not intended to limit the embodiments of the subject matter, or the application and uses of such embodiments.

Figure 1:
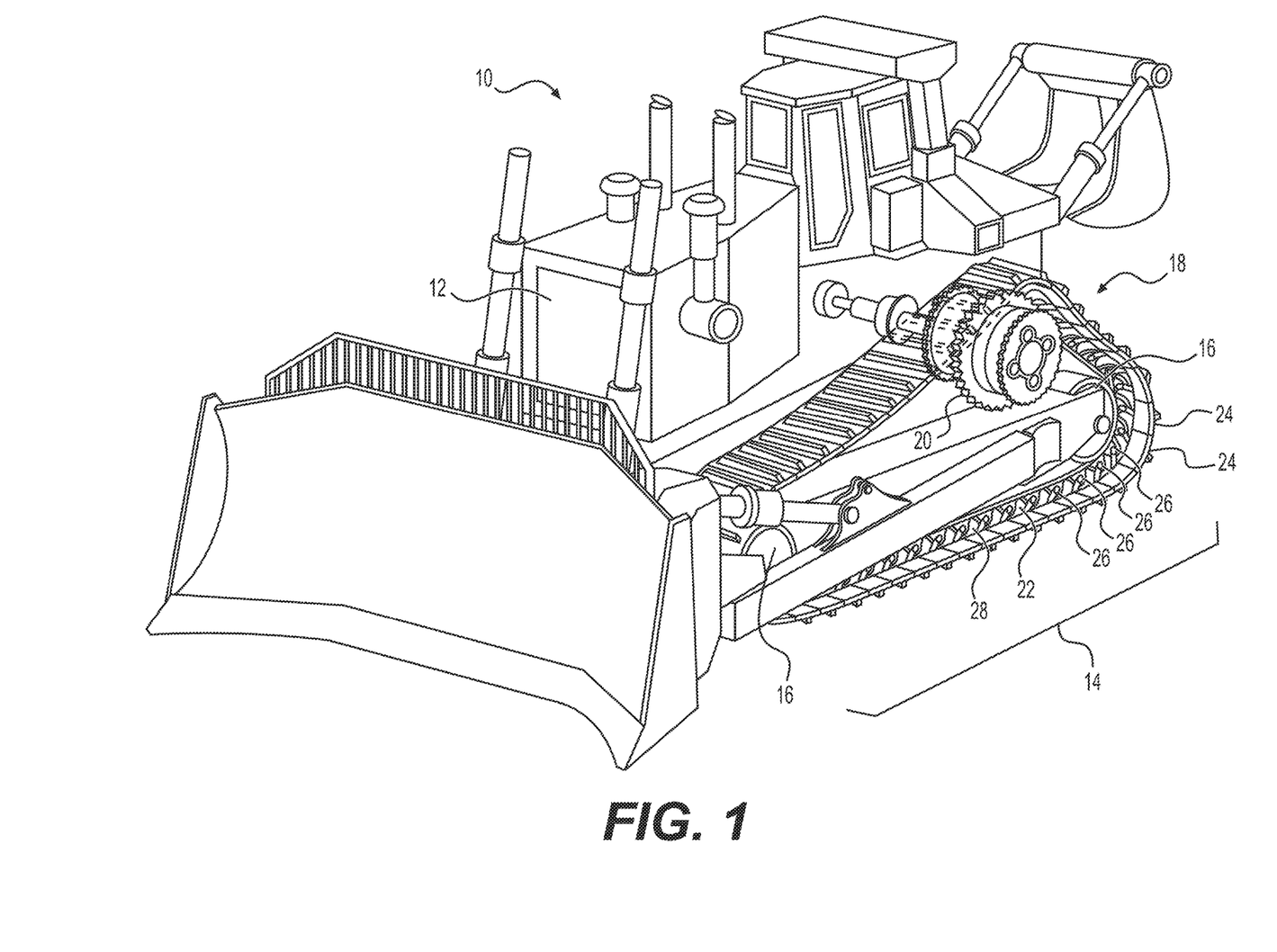
FIG. 1 is a perspective view of an exemplary mobile machine having a track chain.

FIG. 1 illustrates an exemplary machine 10 having multiple systems and components that cooperate to accomplish a task. Machine 10 may embody a mobile machine that performs some type of operation associated with an industry such as mining, construction, farming, transportation, or any other industry known in the art. For example, machine 10 may be an earth moving machine such as an excavator, a dozer, a loader, a backhoe, a motor grader, or any other earth moving machine. Machine 10 may include a power source 12 and an undercarriage assembly 14, which may be driven by power source 12 and supported by one or more spaced-apart pulley mechanisms 16.

Power source 12 may drive undercarriage assembly 14 of machine 10 at a range of output speeds and torques. Power source 12 may be an engine such as, for example, a diesel engine, a gasoline engine, a gaseous fuel powered engine, or any other suitable engine. Power source 12 may also be a non-combustion source of power such as, for example, an electric motor, a fuel cell, a power storage device, or any other source of power known in the art. Undercarriage assembly 14 may include two separate continuous tracks 18, one on either side of machine 10 (only one of which is shown in FIG. 1). Each track 18 may be driven by power source 12 via one or more sprockets 20. In addition, each track 18 includes an endless track chain 22 and a plurality of track shoes 24 coupled to an outer surface of track chain 22. The track shoes 24 are configured to engage a surface, (e.g., the ground) during operation of machine 10. In general, chain 22 may include straight link chains or offset link chains. In the illustrated embodiment, track chain 22 is an offset link chain that includes multiple structurally similar links or link assemblies 26 that are coupled together to form an endless loop. Track chain 22 may also include a master link assembly 28 than enables the track chain 22 to be disassembled or opened to form a chain with two ends. In the discussion below, track chain 22 will be referred to as chain 22.

Figure 2A:
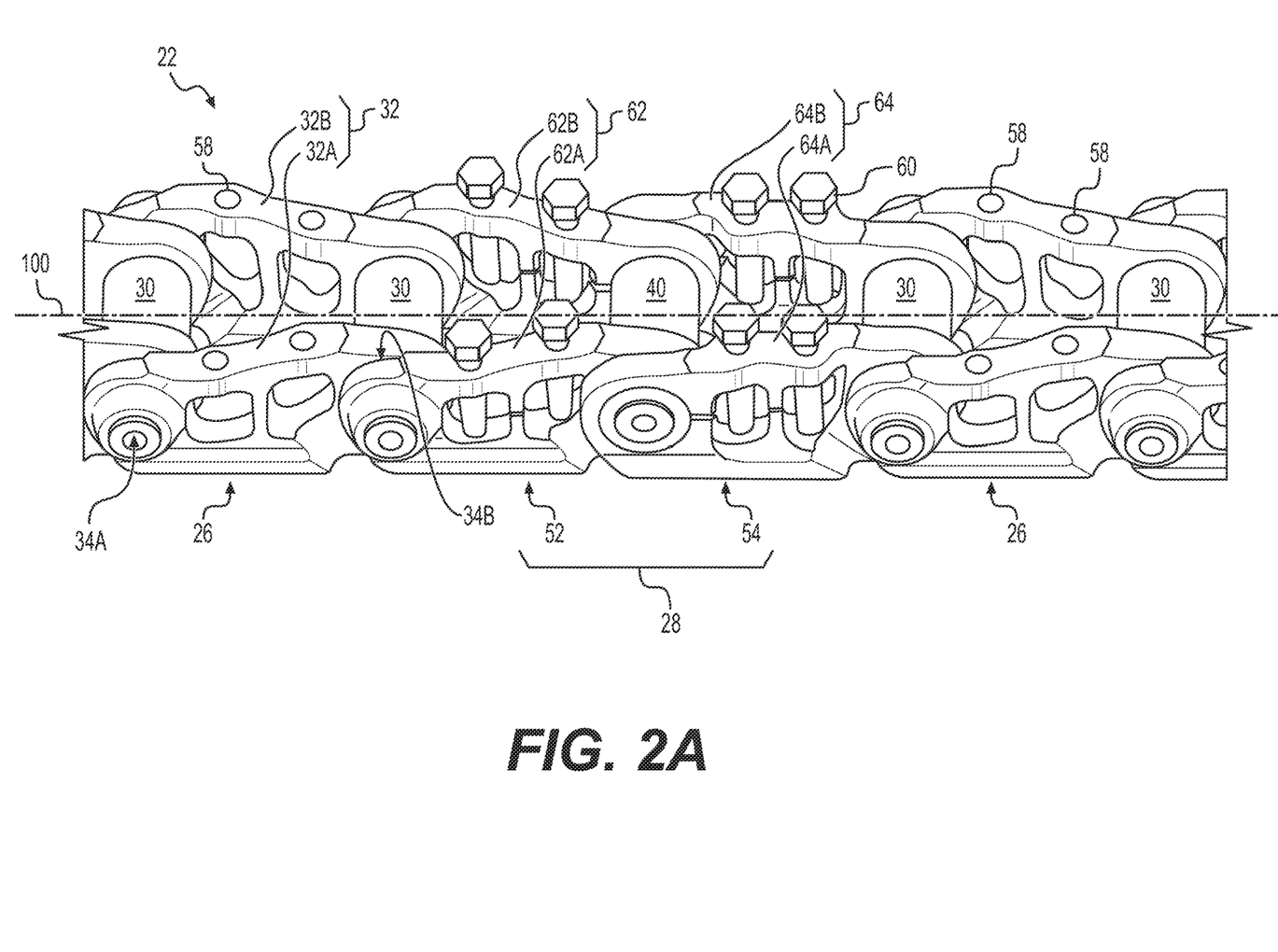
FIGS. 2A-2C are different views of an exemplary master link assembly of the track chain of FIG. 1.
Figure 2B:
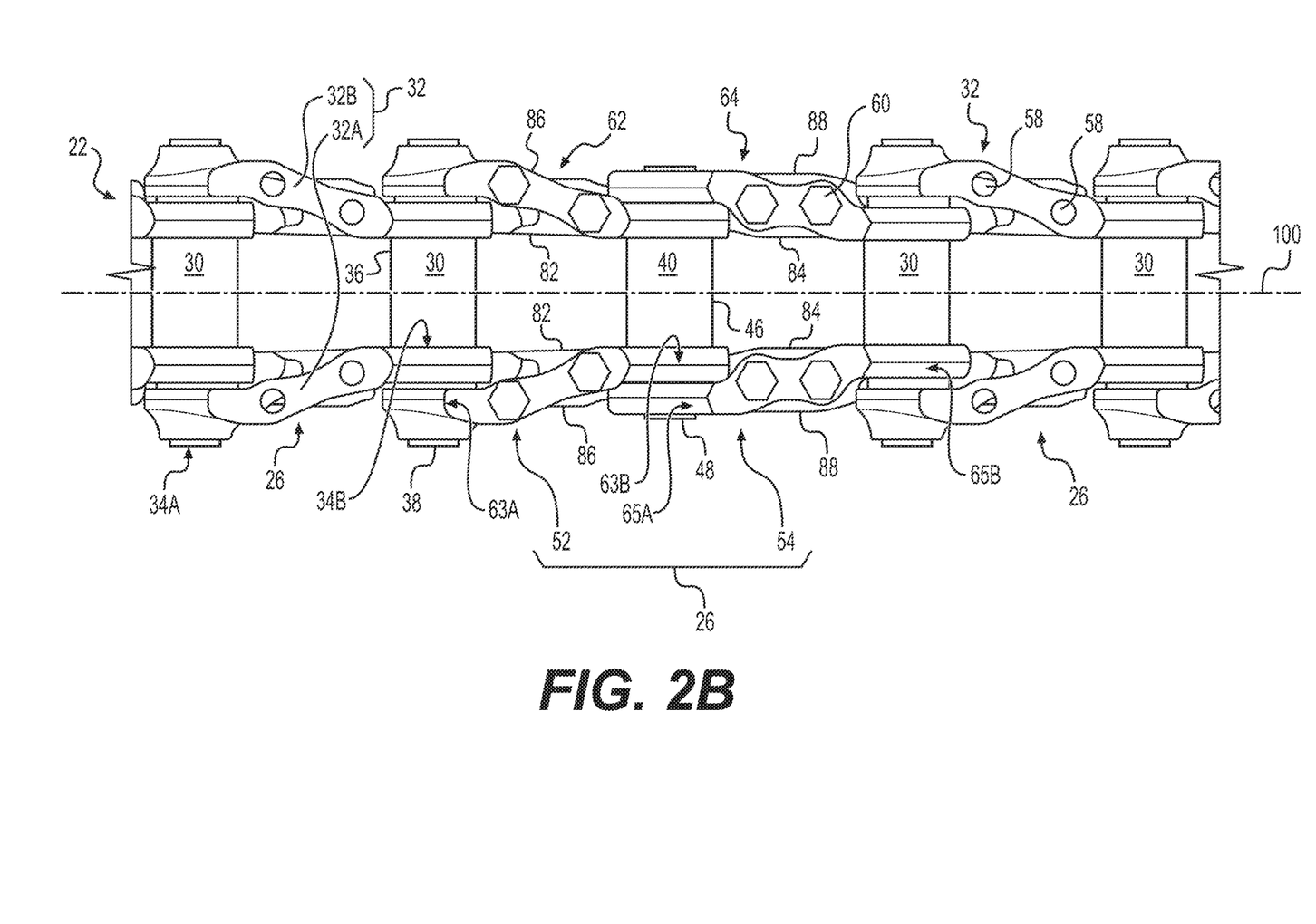
Figure 2C:
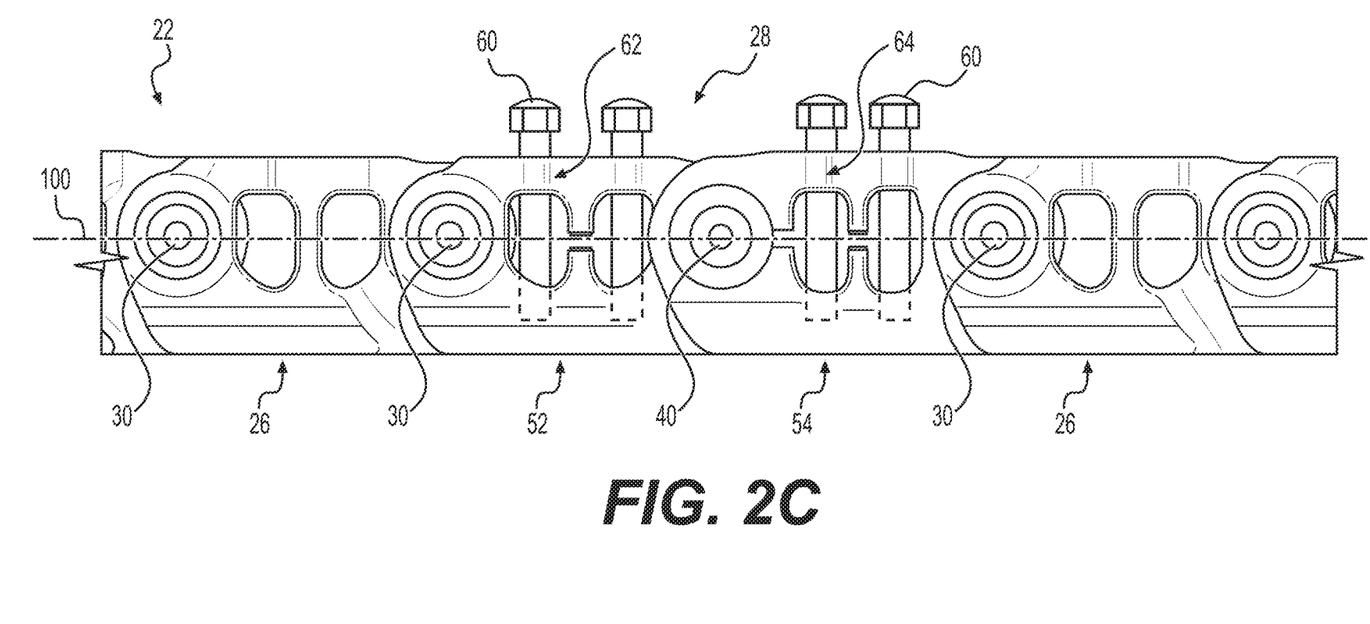

FIGS. 2A-2C respectively illustrate a perspective view, a top-view, and a side-view of a portion of an exemplary offset link chain 22. In the discussion below, reference will be made to FIGS. 2A-2C. Chain 22 includes a plurality of link assemblies 26 and a master link assembly 28. As known to people skilled in the art, each link assembly 26 of chain 22 includes a pair of laterally spaced apart links 32A, 32B that are coupled to each other at their opposite ends by cartridge assemblies 30. When chain 22 is an offset link chain, the configuration (shape, size, etc.) of each link 32A, 32B of the pair may be substantially the same. Therefore, in the description below, links 32A and 32B will be jointly referred to as link 32. Link 32 includes an elongate body that extends from a first end to a second end in the direction of longitudinal axis 100. Link 32 includes a shoe surface (top surface in FIGS. 2A-2C) with fastener holes 58 and a rail surface or roller surface (bottom surface in FIGS. 2A-2C) positioned opposite the shoe surface. The fastener holes 58 may be threaded holes configured to receive a fastener (similar to fastener 60) that may be used to attach a track shoe 24 to link assembly 26. The roller surface of link 32 may be configured to slidably engage with pulley mechanism 16 (and rollers and other guiding components) of undercarriage assembly 14. Each link 32 includes a first aperture 34A at its first end and a second aperture 34B at its second end. Link 32 may also include a plurality (two in FIGS. 2A and 2C) of other apertures (e.g., two apertures in FIGS. 2A and 2C) positioned between the first and second apertures 34A, 34B. These apertures may in general have any shape and may assist in reducing the weight of link 32.

Figure 3A:
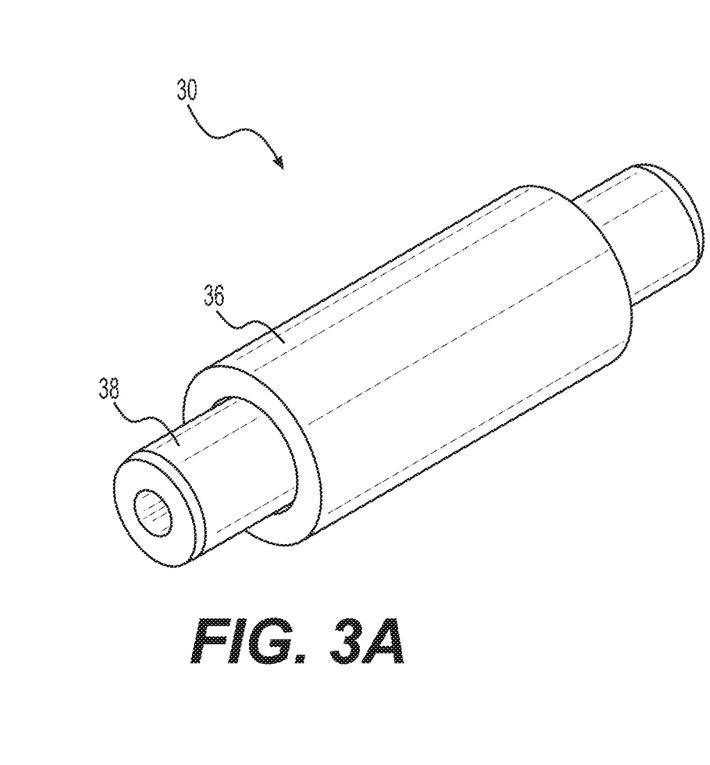
FIG. 3A is a perspective view of an exemplary bushing assembly of the track chain of FIG. 1.

A bushing assembly 30 is used to rotatably couple links 32 of adjacent link assemblies 26 together. FIG. 3A illustrates a perspective view of an exemplary bushing assembly 30. Bushing assembly 30 includes a pin 38 rotatably mounted in a hollow bushing 36. Adjacent link assemblies 26 are coupled by bushing assembly 30 such that the inner surface of the second apertures 34B of one link assembly 26 forms an interference fit an external surface of bushing 26 and the inner surface of the first apertures 34A of an adjacent link assembly 26 forms an interference fit with an external surface of pin 38. That is, the first end of one link assembly 26 is rigidly coupled to pin 38 of a bushing assembly 30 and the second end of an adjacent link assembly 26 is rigidly coupled to bushing 36 of the bushing assembly 30. Rotation of pin 38 in bushing 36 allows the adjacent link assemblies 26 to rotate relative to each other. Multiple link assemblies 26 are thus coupled together by bushing assemblies 30 to form an elongate flexible chain having two free ends. Master link assembly 28 couples the two free ends of the elongate chain to form an endless track chain 22 (i.e., a chain that forms an endless loop).

Figure 3B:
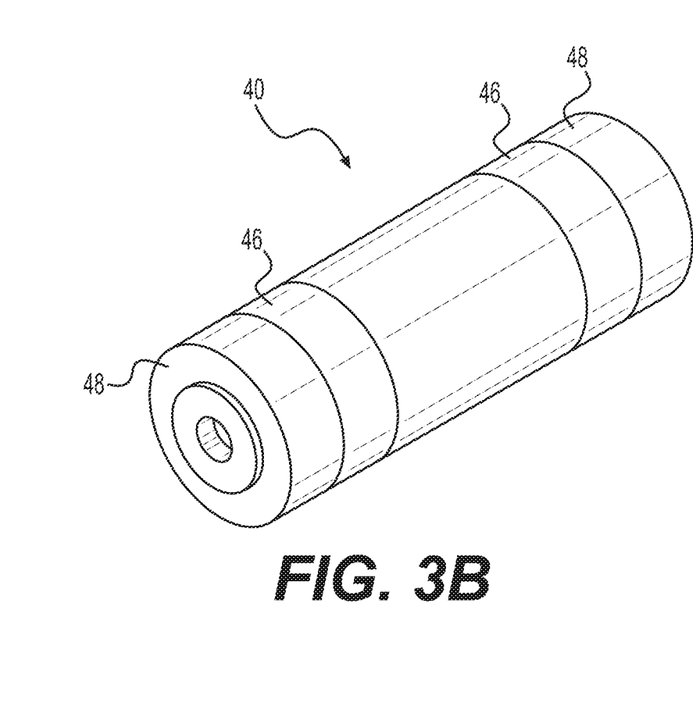
FIG. 3B is a perspective view of an exemplary cartridge assembly of the track chain of FIG. 1.

With continued reference to FIGS. 2A-2C, master link assembly 28 includes a first master link 52 and a second master link 54 that are removably coupled together at one end by a cartridge assembly 40. FIG. 3B is a perspective view of an exemplary cartridge assembly 40. Cartridge assembly 40 may include a pair of bearings 46 rotatably mounted about a pin (not marked in FIG. 3B). A pair of collars 48 are rigidly mounted at either end of the pin. In cartridge assembly 40, bearing 46 and collar 48 can rotate relative to each other. Exemplary cartridge assemblies that may be used in chain 22 of the current disclosure are provided in U.S. Pat. No. 6,382,742, incorporated by reference in its entirety herein. First and second master links 52, 54 are coupled at one end by cartridge assembly 40 such that the first and second master links 52, 54 can rotate relative to each other about cartridge assembly 40. The opposite end of first master link 52 is coupled to one free end of the elongate chain (formed by coupling together multiple link assemblies 26) by a bushing assembly 30. Similarly, the opposite end of second master link 54 is coupled to another free end of the elongate chain using a bushing assembly 30. However, unlike the coupling of links (first master link 52, second master link 54, and links 32 of link assembly 26) by bushing assembly 30, the first and second master links 52, 54 are coupled to cartridge assembly 40 such that the cartridge assembly 40 may be removed from these links to decouple first and second master links 52, 54. As will be explained in more detail later, removing cartridge assembly 40 from first and second master links 52, 54 will decouple first master link 52 from second master link 54 and thereby disassemble or open chain 22 (e.g., transform chain 22 from an endless loop to a chain with two free ends).

With reference to FIGS. 2A-2C, first master link 52 includes first and second links 62A and 62B laterally spaced apart (e.g., in a direction normal to longitudinal axis 100) and positioned in a substantially mirror symmetric manner about longitudinal axis 100. Similarly, second master link 54 includes first and second links 64A and 64B laterally spaced apart and positioned in a substantially mirror manner about longitudinal axis 100. The configuration (shape, size, etc.) of each link 62A, 62B of master link 52 may be substantially the same, and the configuration of each link 64A, 64B of master link 54 may be substantially the same. Therefore, unless it is useful to identify the individual links of a master link, links 62A and 62B will be jointly referred to as first link 62, and links 64A and 64B will be jointly referred to as second link 64. First link 62 may have a configuration (shape, size, etc.) substantially similar to link 32 of link assembly 26. Therefore, unless otherwise noted, the description of first link 62 is equally applicable to link 32 and vice versa.

Figure 4A:
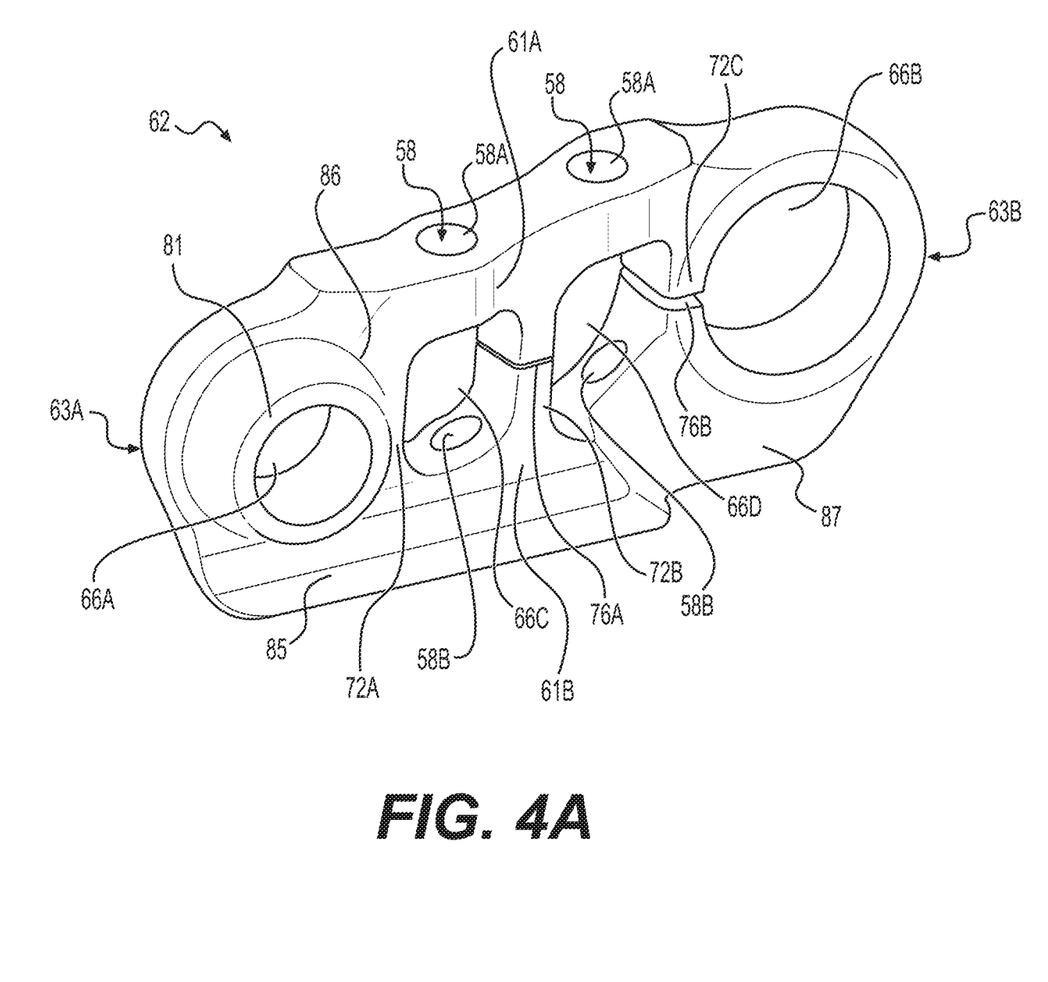
FIGS. 4A and 4B are perspective views of exemplary links of the master link assembly of the track chain of FIG. 1.
Figure 4B:
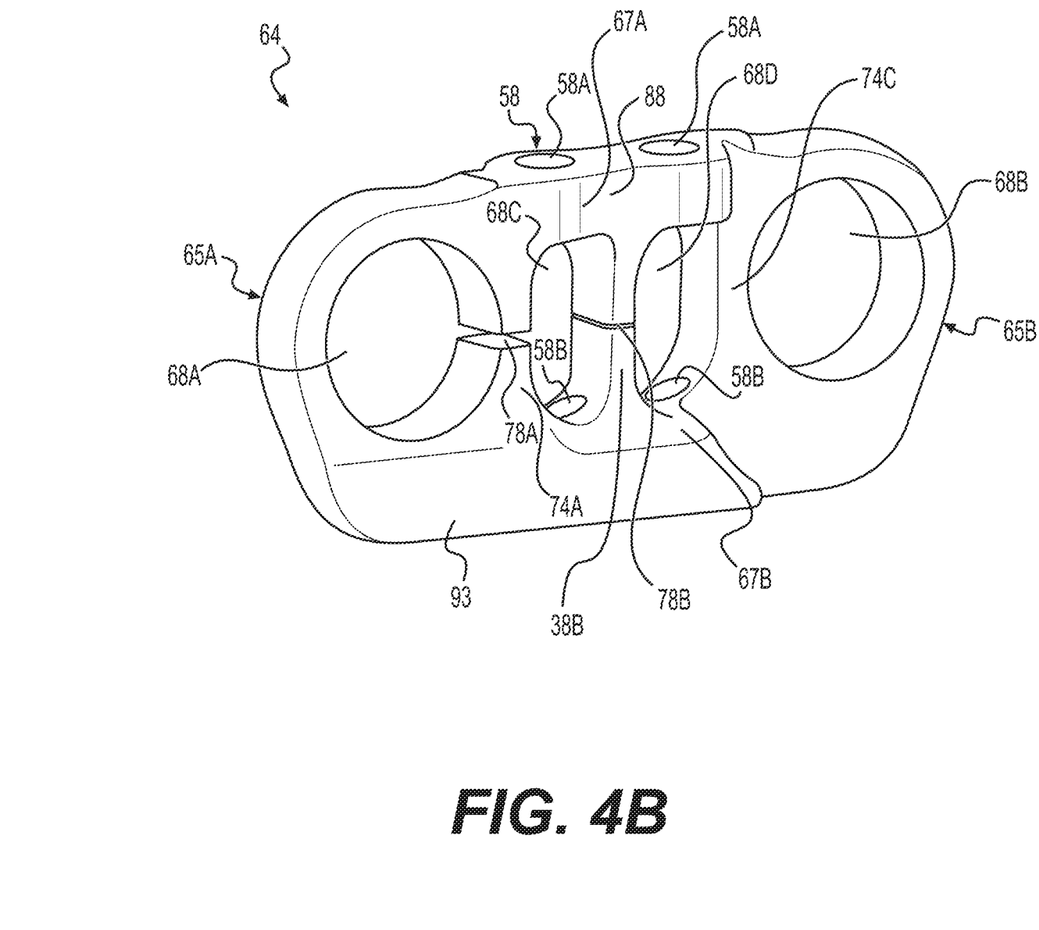

FIGS. 4A and 4B are perspective views of first and second links 62, 64 showing their outer surface. In the discussion below, reference will be made to FIGS. 2A-C and 4A-4B. First link 62 includes an elongate body that extends from a first end 63A to a second end 63B along longitudinal axis 100, and second link 64 includes an elongate body that extends from a first end 65A to a second end 65B along longitudinal axis 100. As best seen in FIG. 2B, when first and second links 62, 64 are assembled in chain 22, the first ends 63A of its individual links 62A and 62B are spaced further apart from each other (and longitudinal axis 100) than their second ends 63B. Similarly, the first ends 65A of links 64A, 64B are spaced further apart from each other (and longitudinal axis 100) than their second ends 65B. Similar to link 32 (of link assembly 26), first and second links 62, 64 include fastener holes 58 on a top surface (shoe surface) and a bottom surface that is configured to slidably engage with guiding components of undercarriage assembly 14. Fastener holes 58 on first link 62 are used to attach a track shoe 24 to first master link 52, and faster holes 58 on second link 64 are used to attach a track shoe 24 to second master link 54. Links 62A and 62B of first master link 52 each include an inner surface 82 that faces each other and an outer surface 86 positioned opposite inner surface 82. Similarly, links 64A and 64B of second master link 54 each includes an inner surface 84 that faces each other and an outer surface 88 positioned opposite inner surface 84.

With reference to FIGS. 4A and 4B, first link 62 includes a first aperture 66A at its first end 63A and a second aperture 66B at its second end 63B. Similarly, second link 64 includes a first aperture 68A at its first end 65A and a second aperture 68B at its second end 65B. First and second links 62 and 64 also include additional apertures between first aperture 66A, 68A and second aperture 66B, 68B. For example, in some embodiments, two apertures 66C and 66D may be provided between first and second apertures 66A, 66B of first link 62, and two apertures 68C and 68D may be provided between first and second apertures 68A, 68B of second link 64. However, two apertures is not a requirement, and in some embodiments, a different number (e.g., 1, 3, 4, etc.) of apertures may be provided between the first and second apertures of first and second links 62, 64. Providing apertures 66C and 66D in first link 62 (and apertures 68C and 68D in second link 64) may reduce the weight of first and second links 62, 64. Each of apertures 66A-66D and 68A-68D extend between outer surface 86, 88 and inner surface 82, 84 of first and second links 62, 64 to define through-hole cavities or openings that extend substantially through the entire thickness of these links. Apertures 66A-66D are arranged along the length of first link 62 such that a strut 72A (or a strip of material) separates apertures 66A and 66C, a strut 72B separates aperture 66C and 66D, and a strut 72C separates apertures 66D and 66B. Similarly, apertures 68A-68D are arranged in second link 64 such that a strut 74A separates apertures 68A and 68C, a strut 74B separates apertures 68C and 68D, and a strut 74C separates apertures 68D and 68B. In general, the shape of struts 72A, 72B, 72C (and 74A, 74B, 74C) depend on the shape of the apertures on either side.

In some embodiments, as illustrated in FIGS. 4A and 4B, first and second apertures 66A, 66B of first link 62 (and first and second apertures 68A, 68B of second link 64) may have a substantially circular shape. In some embodiments, the other apertures 66C, 66D of first link 62 (and apertures 68C and 68D of second link 64) may have a different shape. In some embodiments, apertures 66C, 66D, 68C, 68D may have a generally rectangular shape with rounded corners. However, this shape is only exemplary. In general, these apertures may have any shape (such as, for example, oval, circular, elliptical, square, etc.). In first link 62, apertures 66A-66D delineate or define an upper portion 61A above these apertures and a lower portion 61B below these apertures. Similarly, in second link 64, apertures 68A-68D define an upper portion 67A above the apertures and a lower portion 67B below the apertures.

Fastener holes 58 may be located on first link 62 above apertures 66C and 66D, and fastener holes 58 may be located on second link 64 above apertures 68C and 68D. In first link 62, fastener holes 58 extend through the upper portion 61A and into the lower portion 61B across apertures 66C and 66D. Similarly, in second link 62, fastener holes 58 extend through the upper portion 67A and into the lower portion 67B across apertures 68C and 68D. That is, fastener holes 58 include a first portion 58A that extends through the upper portion 61A, 67A of first and second links 62, 64, and a second portion 58B that extends into the lower portion 61B, 67B of first and second links 62, 64. First and second portions 58A and 58B of fastener holes 58 may be threaded and configured to receive threaded fasteners 60. In the discussion that follows, first and second portions 58A, 58B (of fastener hole 58) will be collectively referred as fastener hole 58. Fasteners 60 in fastener holes 58 may be used to attach track shoes 24 to first and second links 62, 64. In some embodiments, fasteners 60 attached to first link 62 may be used to attach one track shoe 24 to first master link 52, and fasteners 60 attached to second link 64 may be used to attach another track shoe to second master link 54. When fasteners 60 are tightened into a fastener hole 58 of first and second links 62, 64, a portion of the fastener 60 extends through apertures 66C and 66D of first link 62 (and apertures 68C and 68D of second link 64) into the body of the link across the aperture (see FIG. 2C). In some embodiments, in link 32 of link assembly 26 (which as explained previously is substantially similar to first link 62) fastener hole 58 may only extend through the upper portion of the link into the aperture (i.e., the fastener hole in link 32 may not extend into the portion of link 32 below the aperture).

With reference to FIG. 4A, in first link 62, first aperture 66A on first end 63A may be smaller in diameter than second aperture 66B on second end 63B. A substantially cylindrical flange 81 may be positioned around first aperture 66A extending outwards from its outer surface 86. When first end 63A of first link 62 is coupled with link 32 of link assembly 26 using a bushing assembly 30 (see FIGS. 2A and 2B), the inner surface of first aperture 66A and flange 81 may form an interference fit with pin 38 of bushing assembly 30. When second end 63B of first link 62 is coupled to first end 65A of second link using cartridge assembly 40, an inner surface of second aperture 66B may interface with an external surface of bearing 46 of cartridge assembly 40 (see FIG. 3B). Although not described in detail herein, outer and inner surfaces 86, 82 of first link 62 may be contoured to receive correspondingly shaped regions of components that it interfaces with when assembled on chain 22. Outer surface 86 may also include a projection 85 at its roller surface (surface that engages with pulley mechanisms 16, see FIG. 1) that extends from first end 63A towards second end 63B. Projection 85 may increase the surface area of first link 62 that engages with pulley mechanism 16.

With reference to FIG. 4B, in second link 64, first and second apertures 68A, 68B may have a substantially circular shape. With additional reference to FIGS. 2A and 2B, when second link 64 is assembled on chain 22, an inner surface of the first aperture 68A interfaces with an outer surface of collar 48 of cartridge assembly 40 (see FIG. 3B), and an inner surface of second aperture 68B forms an interference with bushing 36 of bushing assembly 30 (see FIG. 3A). In general, the diameters of first and second apertures 68A, 68B may depend on the size of the interfacing components or regions of bushing and cartridge assemblies 30, 40. In some embodiments, the diameters of first and second apertures 68A, 68B may be substantially the same. However, this is not a requirement. That is, in some embodiments, first aperture 68A may be smaller than, or larger than, the diameter than second aperture 68B. The shape of second link 64 may also depend on the size (e.g., length) of bushing and cartridge assemblies 30, 40 that couple second link 64 to adjacent links on either side. For example, in embodiments where the spacing between the pair of collars 48 (or the length) of cartridge assembly 40 is greater than the length of the bushing 36 of bushing assembly 30, the first end 65A of second link 64 may be offset from the second end 64B in a direction transverse to the longitudinal axis 100 (see FIG. 2B). The amount of offset depends on the difference in the lengths of the bushing and cartridge assemblies 30, 40. In some embodiments, as best seen in FIG. 2B, a portion of second link 64 between its first and second ends 65A, 65B may extend substantially parallel to the longitudinal axis 100, and the first and second ends 65A, 65B may be offset from this linear portion. The outer and inner surfaces 88, 84 of second link 64 may also be contoured to receive correspondingly shaped regions of components that it interfaces with when assembled on chain 22. For example, a region adjacent to the roller surface of second link 64 may be wider (than regions above this region) to increase the surface area of second link 64 that will interface with pulley mechanism 16 (and other guiding members).

As best seen in FIGS. 4A and 4B, in first link 62, a gap 76A extends through strut 72B between apertures 66C and 66D to fluidly connect these two apertures, and a gap 76B extends between and fluidly connects apertures 66D and 66B. And, in second link 64, a gap 78A extends between apertures 68A and 68C, and a gap 78B extends between apertures 68C and 68D. As can be seen in FIGS. 4A and 4B, first aperture 66A of first link 62 and second aperture 68B of second link 64 are not connected by a similar gap to any other apertures of the link. That is, first aperture 66A and second aperture 68B may have a continuous perimeter. These gaps 76A, 76B, 78A, 78B extend completely between inner and outer surfaces of the respective link to divide the strut into two parts (e.g., an upper section above the gap and a lower section below the gap). For example, in first link 62, gap 76A may divide strut 72B that extends between apertures 66C and 66D into two sections (an upper section connected to upper portion 61A and a lower section connected to lower portion 61B), and gap 76B divides strut 72C that extends between aperture 66D and second aperture 66B into two sections. Similarly, in second link 64, gap 78A divides strut 74A that extends between first aperture 68A and aperture 68C into two sections (an upper section connected to upper portion 67A and a lower section connected to lower portion 67B), and gap 78B divides strut 74B that extends between apertures 68C and 68D into two sections. Although link 32 of link assembly 26 is structurally similar to first link 62, link 32 does not include gaps (similar to gaps 76A and 76B) on struts that separate its apertures.

In general, gaps 76A and 76B of first link 62, and gaps 78A and 78B of second link 64 may have any size (e.g., gap thickness). In some embodiments, these gaps may have the same general size. In some embodiments, gap 76B of first link 62 may have substantially the same size as gap 78A of second link 64, and gap 76A of first link 62 may have substantially the same size as gap 78B of second link 64. In some embodiments, as shown in FIGS. 4A and 4B, the size of gap 76A may be smaller than gap 76B, and the size of gap 78B may be smaller than gap 78A. In some embodiments, gaps 76A and 78B may be between about 0.25-2 millimeters (mm) thick and gaps 76B and 78A may have a thickness greater than this value. In some embodiments, gaps 76A and 78B may be about 1 mm thick, or about 0.75 mm thick, or about 0.5 mm thick (with thickness of gap 76B greater than gap 76A and thickness of gap 78A greater than gap 78B).

In their normal state (e.g., without fasteners 60), the natural rigidity of the link body may keep the upper and lower portions 61A and 61B of first link 62 (and the upper and lower portions 67A and 67B of second link 64) separated from each other, and maintain gaps 76A and 76B (gaps 78A and 78B of second link 64) at their maximum values. When fasteners 60 are inserted and tightened into the first and second portions 58A, 58B (of fastener holes 58, for example, to attach track shoes 24 to first and second links 62, 64), the fastener 60 may apply a force to compress the link, or the upper and lower portions of each link closer to each other. Due to this force, the natural rigidity of the link body may be at least partly overcome, and the upper and lower portions of the first and second links 62, 64 may come closer towards each other and reduce the width of gaps 76A, 76B, 78A, and 78B. The size (e.g., thickness, etc.) of first and second link 62, 64 may be such that, fasteners 60 can overcome the rigidity of the link body and urge the upper and lower body portions towards one another. Gaps 76A and 76B of first link 62 may be configured such that (e.g., sized) the diameter of second aperture 66B decreases from a first higher value to a second lower value when the upper and lower portions of first link 62 are urged towards each other by fasteners 60. Similarly, gaps 78A and 78B of second link 64 may be configured such that the diameter of first aperture 68A decreases from a higher value (e.g., first value) to a lower value (e.g., second value) when the upper and lower portions of second link 64 are urged towards each other by fasteners 60. When fasteners 60 are removed or loosened from their corresponding fastener holes 58, the diameters of first and second apertures 68A, 66B return to their first values.

First and second apertures 68A, 66B may be configured such that, when the upper and lower portions of first and second links 62, 64 are urged towards each other by fasteners 60, the diameters of the first and second apertures 68A, 66B (i.e., second value of these diameters) are substantially equal to, or slightly smaller than, the regions of the cartridge assembly 40 that each aperture interfaces with. For example, when fasteners 60 are tightened on fastener holes 58 of first link 62, second aperture 66B of first link 62 decreases in diameter from a higher value to a value that is equal to, or slightly smaller than, the outer diameter of bearing 46 to tightly couple the second end 63B of first link 62 to cartridge assembly 40. Similarly, when fasteners 60 are tightened on fastener holes 58 of second link 64, the diameter of first aperture 68A (of second link 64) reduces to a value equal to, or slightly smaller than, the outer diameter of collar 48 to tightly couple the first end 65A of second link 64 to cartridge assembly 40. In this configuration, the second end 63B of first link 62 and first end 65A of second link 64 are tightly coupled together. That is, in this configuration, cartridge assembly 40 cannot be moved relative to (e.g., removed from or slid out of) second aperture 66B of first link 62 and first aperture 68A of second link 64. And, when the fasteners 60 that urge the upper and lower portions of first and second links 62, 64 are loosened or removed, the diameters of the first and second apertures 68A, 66B return to the first value which is larger than the diameter of cartridge assembly 40. In this configuration, cartridge assembly 40 can be moved relative to (e.g., removed from or slid out of) second aperture 66B of first link 62 and first aperture 68A of second link 64. Thus, increasing and decreasing the diameters of second aperture 66B of first link 62 and first aperture 68A of second link 64 via fasteners 60 enable the first and second links 62, 64 to be removably coupled together using cartridge assembly 40. In contrast, the removal of fasteners 60 do not change the diameters of first aperture 66A of first link 62 and second aperture 68B of second link 64. Therefore, the first end 63A of first link 62 and the second end 65B of second link 64 remain tightly coupled to ends of links 32 by bushing assemblies 30.

In first link 62, in embodiments where the size of gap 76A is smaller than gap 76B, the size of gap 76A may limit the movement of the upper and lower portions 61A, 61B towards each other. Similarly, in second link 64, in embodiments where the size of the size of gap 78B is smaller than gap 78A, the size of gap 78B may limit the movement of the upper and lower portions 67A, 67B towards each other. The size of gaps 76A and 78B may also limit the amount by which the diameters of second aperture 66B of first link 62 and first aperture 68A of second link 64 decrease. For example, in an exemplary embodiment where gaps 76A and 78B are about 0.75 mm thick, the maximum decrease in diameter of first and second apertures 68A, 66B is also about 0.75 mm. Since the amount of clamping force generated by the inner walls of first and second apertures 68A, 66B on cartridge assembly 40 is related to the diameters of these apertures, the size of gaps 76A and 78B may affect the amount of clamping force on cartridge assembly 40. Since a single gap (i.e., gap 76A in first link 62 and gap 78B in second link 64) in each link controls the clamping force, machining tolerance requirements of the other gaps may be lower, thus reducing cost. For example, during fabrication of first and second links 62, 64, only gaps 76A and 78B have to be machined with a tight tolerance. In general, gaps 76A and 78B may be sized so that first and second apertures 68A, 66B generate sufficient clamping force to retain cartridge assembly 40 within first and second apertures 68A, 66B. It should be noted that although first and second links 62, 64 are described as having two gaps (76A and 76B in first link 62 and 78A and 78B in second link 64), this is only exemplary. In some embodiments, one or both of these links may only have one gap (e.g., gap 76B in first link 62 and gap 78A in second link 64).

In general, first and second links 62, 64 may be made from any material known in the art having enough stiffness to keep upper and lower portions of the respective link separated without a biasing force and to enable the upper and lower portions to be urged towards each other by fasteners 60. In addition, the material may be durable to withstand repeated use. Although not a requirement, in some embodiments, first and second links 62, 64 may be made from a carbon steel such as a 15B34 carbon steel. In some embodiments, first and second links 62, 64 (or portions thereof) may be covered with a protective coating to shield the links from the environment in which machine 10 may be operating. Although not a requirement, in some embodiments, fasteners 60 may be made from the same material as first and second links 62, 64.

It should be noted that, although first and second links 62, 64 are illustrated as having two apertures each (66c, 66D, 68C and 68D) positioned between their first and second apertures (66A, 66B, 68A, and 68B), and one fastener 60 extending through each aperture, this is only exemplary. In some embodiments, a different number of fasteners may extend through each aperture. In some embodiments, a different number of apertures may be provided between first and second apertures of first and second links 62, 64. For example, in some embodiments, one or both of first and second links 62, 64 may have only one aperture (e.g., third aperture) between their first and second apertures (66A, 66B, 68A, and 68B). In such embodiments, a gap will extend through the link body from the third aperture to the second aperture 66B of first link 62, and a gap will extend through the link body from the third aperture to the first aperture 68A of the second link 64. And, one or more (e.g., two fasteners) may extend through the third aperture to compress each link 62, 64 and change the width of the gap (and thereby first and second apertures 68A and 66B).

INDUSTRIAL APPLICABILITY

The disclosed master link assembly 28 and, in particular the first and second master links 52, 54 of master link assembly 28, may be applicable to any tracked machine 10 having a track chain 22 (straight link chains or offset link chains). The disclosed masker link assembly enables the track chain 22 to be easily and quickly disassembled thereby reducing maintenance cost and machine down time.

An exemplary method of assembling and disassembling a track chain 22 will now be described. To connect the two free ends of track chain 22 together using master link assembly 28, the first end 63A of first link 62 is coupled to one free end of chain 22 using a bushing assembly 30, and the second end 65B of second link 64 is coupled to the other free end of chain 22 using another bushing assembly 30. With reference to FIGS. 2A and 2B, to couple master link assembly 28 to chain 22, a bushing 36 of a bushing assembly 30 is first fitted through aligned second apertures 34B of links 32A and 32B of a link assembly 26. The first master link 52 (of master link assembly 28) is arranged such that first apertures 66A at its first end 63A are coaxial with the cavity of bushing 36, and pin 38 of bushing assembly 30 is forced into the aligned apertures. The second ends 65B of second master link 54 are similarly coupled with the other free end of chain 22. Second end 63B of first master link 52 and first end 65A of second master link 54 are then coupled together using cartridge assembly 40.

When coupling first and second links 62, 64 of first and second master links 52, 54 together, these links may not initially include fasteners 60 and track shoes 24. With the fasteners 60 removed (or are loosened), gaps 76A and 76B of first link 62 and gaps 78A and 78B of second link 64 may be at their maximum thickness or size. Consequently, second aperture 66B of first link 62 and first aperture 68A of second link 62 may be at their maximum diameters (i.e., first value of diameter). First link 62 and second link 64 may now be aligned such that second aperture 66B of first link 62 is co-axial with first aperture 68A of second link 62. Cartridge assembly 40 may now be inserted through the aligned apertures to link first and second master links 52, 54 together. In this configuration, since the diameter of the first and second apertures 68A, 66B are greater than the outer diameter of cartridge assembly 40, the cartridge assembly 40 may be moved relative to (or may be slid out of the apertures of) first and second links 62, 64. Track shoes 24 may now be secured to the shoe surfaces of first and second links 62, 64 by inserting fasteners 60 into fastener holes 58 on first and second links 62, 64. As each fastener 60 is tightened, portions of the fastener 60 engage with first and second portions 58A, 58B of the fastener holes 58, and urge (or pull) the upper and lower body portions of first and second links 62, 64 toward each other. As the upper and lower body portions move toward each other, the widths of gaps 76A and 76B of first link 62 and gaps 78A and 78B of second link 64 decrease. As the width of gaps 76A and 76B decrease, the diameter of the second aperture 66B of first link 62 decreases causing the inner surface of the second aperture 66B to clamp on the outer surface of bearing 46 of cartridge assembly 40. Similarly, as the widths of gaps 78A and 78B decrease, the diameter of the first aperture 68A of second link 64 also decreases, causing the inner surface of the first aperture 68A to clamp on the outer surface of collars 48 of the cartridge assembly 40 positioned within these apertures.

To separate chain 22, fasteners 60 may be loosened (or unthreaded or removed from second portion 58B of fastener holes 58) from first and second links 62, 64. When fasteners 60 are loosened or removed, the diameter of second aperture 66B (of first link 62) and first aperture 68A (of second link 62) return to their original larger value (i.e., first value), and cartridge assembly 40 may be slid out from within these apertures. Providing a master link assembly 28 that may be easily decoupled to separate track chain 22 enables the chain 22 to be quickly disassembled, and thus reduces machine down time and maintenance cost.

It will be apparent to those skilled in the art that various modifications and variations can be made in the disclosed system without departing from the scope of the disclosure. For example, although the current disclosure has been described with reference to an offset link chain, aspects of the current disclosure may also be applied on straight link chain. Other embodiments will be apparent to those skilled in the art from consideration of the specification disclosed herein. It is intended that the specification and examples be considered as exemplary only, with a true scope being indicated by the following claims and their equivalents.

What is claimed is:

1. A master link for a track chain, comprising:
   a link body extending from a first end to a second end;
   a plurality of apertures extending through the link body, the plurality of apertures including (a) a first aperture having a first diameter positioned proximate the first end, (b) a second aperture unconnected to the first aperture and positioned proximate the second end, the second aperture having a second diameter greater than the first diameter, and (c) a third aperture arranged between the first and second apertures;
   a substantially cylindrical flange extending around the first aperture such that a depth of the first aperture is greater than a depth of the second aperture;
   a first gap extending between and connecting the second and third apertures; and
   a threaded first fastener configured to extend through the link body across the third aperture.

2. The master link of claim 1, wherein the first aperture has a continuous perimeter.

3. The master link of claim 1, wherein the first aperture is offset from the second aperture in a direction transverse to a length direction of the link body.

4. The master link of claim 1, further including a fourth aperture positioned between the first aperture and the third aperture, and a second gap extending between and connecting the third and fourth apertures.

5. The master link of claim 4, wherein a thickness of the second gap is smaller than a thickness of the first gap.

6. The master link of claim 5, wherein the thickness of the second gap is between about 0.25-2 millimeters.

7. The master link of claim 6, wherein the thickness of the second gap is about 0.75 millimeters.

8. The master link of claim 4, further including a threaded second fastener configured to extend through the link body across the fourth aperture.

9. The master link of claim 8, wherein the first and second fasteners extend through the link body in a direction transverse to a length direction of the link body.

10. The master link of claim 8, wherein the first fastener extends through the link body above and below the third aperture, and the second fastener extends through the link body above and below the fourth aperture.

11. A master link assembly for a track chain, comprising:
    a first link extending from a first end to a second end, wherein the first link includes:
       a first aperture positioned proximate the first end;
       a second aperture positioned proximate the second end;
    at least one threaded first fastener coupled to the first link, wherein changing a relative position of the at least one first fastener with respect to the first link selectively changes a diameter of the second aperture without changing the diameter of the first aperture;
    a second link extending from a third end to a fourth end, wherein the second link includes:
       a third aperture positioned proximate the third end;
       a fourth aperture positioned proximate the fourth end; and
    at least one threaded second fastener coupled to the second link, wherein changing a relative position of the at least one second fastener with respect to the second link selectively changes a diameter of the third aperture without changing the diameter of the fourth aperture; and
    a cartridge assembly configured to be inserted into the second aperture of the first link and the third aperture of the second link.

12. The master link assembly of claim 11, wherein the first link includes a fifth aperture positioned between the first and second apertures, and the second link includes a sixth aperture positioned between the third and fourth apertures.

13. The master link assembly of claim 12, wherein at least one first fastener of the first link extends into the fifth aperture, and at least one second fastener of the second link extends into the sixth aperture.

14. The master link assembly of claim 12, wherein a strut of the first link that separates the second and fifth apertures includes a first gap that connects the second and fifth apertures, and a strut of the second link that separates the third and sixth apertures includes a second gap that connects the third and sixth apertures.

15. The master link assembly of claim 11, wherein the second link includes a sixth aperture and a seventh aperture positioned between the third and fourth apertures, and a strut that separates the third and sixth apertures includes a first gap that connects the third and sixth apertures, and a strut that separates the sixth and seventh apertures includes a second gap that connects the sixth and seventh apertures.

16. The master link assembly of claim 15, wherein a thickness of the first gap is greater than a thickness of the second gap.

17. An track chain assembly, comprising:
    a plurality of link subassemblies including a first link subassembly and a second link subassembly;

a first master link assembly including a pair of first links, wherein each first link of the pair of first links includes a link body that extends from a first end rotatably coupled to the first link subassembly to a second end, and includes (a) a first aperture positioned proximate the first end, (b) a second aperture positioned proximate the second end and unconnected to the first aperture, (c) a fifth aperture positioned between the first and second apertures, (d) a first gap extending between and connecting the second and fifth apertures, and (e) a threaded first fastener extending through the link body across the fifth aperture;

a second master link assembly including a pair of second links, wherein each second link of the pair of second links includes a link body that extends from a third end rotatably coupled to the first master link assembly to a fourth end rotatably coupled to the second link subassembly, and includes (f) a third aperture positioned proximate the third end, (g) a fourth aperture positioned proximate the fourth end and unconnected to the third aperture, (h) a sixth aperture positioned between the third and fourth apertures, (i) a second gap extending between and connecting the third and sixth apertures, and (j) a threaded second fastener extending through the link body across the sixth aperture; and a cartridge assembly extending through the second apertures of the pair of first link and the third apertures of the pair of second links.

18. The track chain assembly of claim 17, changing a relative position of the first fastener with respect to the first link changes a diameter of the second aperture without changing the diameter of the first aperture, and changing a relative position of the second fastener with respect to the second link changes a diameter of the third aperture without changing the diameter of the fourth aperture.

19. The track chain assembly of claim 17, wherein each first link of the pair of first links further includes a seventh aperture positioned between the first and fifth apertures and a third gap extending between and connecting the seventh and fifth apertures.

20. The track chain assembly of claim 19, wherein a thickness of the first gap is greater than a thickness of the third gap, and wherein the thickness of the third gap is between about 0.25-2 millimeters.

* * * * *